United States Patent Office 3,512,003
Patented May 12, 1970

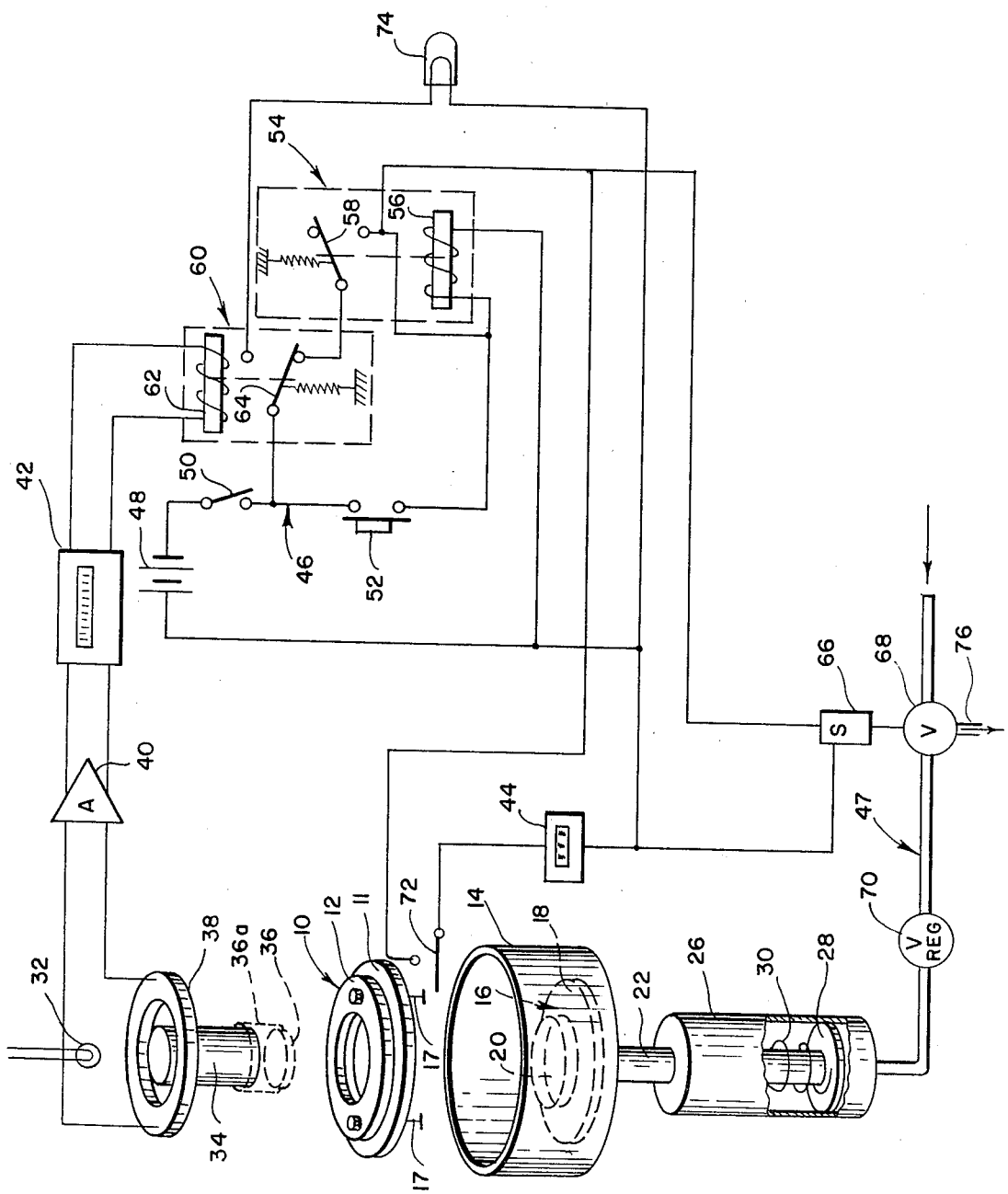

3,512,003
RADIATION SENSITIVE PENETROMETER FOR PAPER
John William Berry, Stamford, Raymond Anthony Herrmann, Ridgefield, and Le Roy Harold Barum, Fairfield, Conn., assignors to American Cyanamid Company, Stamford, Conn., a corporation of Maine
Filed Oct. 3, 1968, Ser. No. 764,770
Int. Cl. G01n 5/02, 21/30
U.S. Cl. 250—222     10 Claims

ABSTRACT OF THE DISCLOSURE

A penetrometer is provided for measuring the resistance of sized paper and similar sized webs to penetration by colored fluids. The device automatically applies a quantity of colored fluid to one surface of sized paper or other web, starts a timer at the instant the fluid is applied to the web, and stops the timer when the surface reflectance of the other surface of the web has decreased to a predetermined value caused by penetration of the web by the fluid.

---

This invention relates to a penetrometer, and more particularly to an automatic penetration device for testing the resistance of sized paper and other sized webs to penetration by colored fluids.

To maintain quality control in the manufacture of sized paper and other sized webs, hereinafter referred to as paper, and to facilitate the development of sizing compositions, it is desirable to provide a device for quickly, conveniently, and accurately testing the extent to which the paper is sized and thereby to determine the sizing efficiency of paper sizing compositions in the paper.

One known method for determining the extent of sizing is to measure the length of time required for a quantity of colored fluid, for example ink, to penetrate a sample of the sized paper. The rate of penetration of the fluid is inversely proportional to the efficiency of the size. Unfortunately, systems that have been provided in the past for carrying out such test methods have not proven entirely satisfactory.

Some of these systems require the operator to perform manual control operations, such as applying a specific quantity of ink to the sized paper samples and visually monitoring measuring devices to determine the extent of sizing. Constant attention of the operator is consequently required. Further, because these systems are dependent upon the personal skills of the operator, they do not provide accurate and consistent results.

Accordingly, it is an object of this invention to provide a new and improved automatic penetrometer for determining the resistance of sized paper to penetration by colored fluids. A further object is to provide a penetrometer that affords accurate and consistent determinations of this resistance in a quick, convenient, consistent, and trouble-free manner.

In accordance with its purpose, this invention provides an automatic device for measuring the resistance of paper to penetration of a colored fluid. This device includes means for holding a sample of the paper, a source of light for illuminating one surface of the sample, and a light sensitive means for receiving light reflected by the sample and producing an electrical output in proportion to the amount of light received.

A fluid applicator is provided for applying a given quantity of colored fluid to the surface of the sample opposite the illuminated surface. The fluid applicator includes reciprocating means for bringing the fluid into and out of contact with the sample. Indicating means, such as a timer, are provided to measure the time interval between application of colored fluid to one surface of the sample and the occurrence of a predetermined amount of change in the reflectance of the other surface of the sample. The change in reflectance, which results from penetration of the sample by the fluid, produces a corresponding change in the electrical output of the light sensitive means.

Automatic cycling means are further provided for actuating and controlling the fluid applicator reciprocating means and the indicating means to bring the colored fluid into contact with the sample and simultaneously start the indicating means. The cycling means also stops the indicating means and withdraws the fluid from contact with the sample when the electrical output of the light sensitive means reaches the predetermined value.

Both the foregoing general description and the following detailed description are exemplary and explanatory and are not intended to be restrictive of the invention.

The invention is more particularly described in the drawing, which is a schematic diagram of a penetrometer according to this invention showing the electrical and pneumatic circuits for achieving automatic operation of the penetrometer.

As shown in the drawing, a holder 10 is provided for holding a sample of paper to be tested. Holder 10 includes a supporting plate 11 and a frame 12, both of which are doughnut-shaped, so that the top and bottom of the center portion of the paper are exposed.

A cylindrical reservoir 14 for holding a supply of the colored fluid to be applied to the sample during the test (such as ink) is located beneath supporting plate 10 and includes a fluid applicator, generally indicated as 16, that is slidably mounted axially of the reservoir. Adjustable stops 17 are provided on the bottom of plate 11 to allow only limited upward movement of the fluid applicator, as will be more fully described below.

Fluid applicator 16 includes paddle 18 and well 20 mounted to the top of the paddle for holding a specific quantity of the colored fluid. Paddle 18 is fixed to shaft 22 that slides axially through an oil seal or other suitable sealing means, not subject to attack by the fluid in reservoir 14.

Fluid applicator reciprocating means are provided for lowering well 20 of fluid applicator 16 into reservoir 14 to fill the well and for raising the well out of the reservoir to bring the fluid into contact with the paper. As embodied, this means includes a single-acting pneumatic cylinder 26 having a piston 28 attached to shaft 22 for lifting fluid applicator 16 out of reservoir 14 and a spring 30 for returning the applicator to its initial position.

Operation of fluid applicator 16 will be more fully described below in connection with the description of the operation of the penetrometer of this invention.

The penetrometer includes a light source 32 and a collimator 34. The collimator is located between light source 32 and a sample in holder 10 to permit adjustment of the size and location of the light beam transmitted to the paper. Light source 32 is preferably a "grain of wheat" bulb, because of its low heat output and its high level of illumination and is preferably supplied with direct current.

When light source 32 is an incandescent bulb, the voltage supplied should provide a filament temperature (and thereby a light color) that contrasts with the color of the test fluid so that a linear response in the change of the light sensitive means with respect to the light reflected by the paper will be obtained. Preferably, the voltage varies and optimum voltage is most easily determined by trial. For example, 22.5 volts supplied to a Type 327 incandescent bulb has proven satisfactory.

A removable filter 36 (as shown in dotted lines in the drawing) is provided between light source 32 and holder 10 and held in place by snap ring 36a to provide a standard decrease in the light level for calibrating the light sensing system. Preferably, filter 36 is a conventional neutral density (non-color dependent) 80% transmission filter which provides a known 20% change from the 100% starting point.

The light beam is transmitted down and focused on the upper surface of the paper sample in holder 10 and reflected back. In accordance with this invention, light sensitive means are provided for receiving the reflected light and for producing an electrical output proportional to the amount of light received. As embodied, this means comprises barrier-layer photocell 38 axially surrounding light source 32. The electrical output of photocell 38 is amplified at 40 and measured by a microammeter 42. Microammeter 42 is a noncontacting switching device that has a low limit and manually adjustable set point.

In accordance with the invention indicating means are provided for measuring the elapsed time interval between application of the fluid to the underside of the paper sample and the change in the electrical output of photocell 38 to a predetermined value. This change in electrical output occurs as a result of penetration of the paper by the fluid. As embodied, this indicating means comprises a timer 44 that is actuated and controlled by a cycling means.

The cycling means starts timer 44 at the instant the meniscus of the fluid in well 20 is contacted with the bottom of the paper sample and stops the timer when the surface reflectance from the sample, as measured by ammeter 42, has decreased to a predetermined value. Hence, timer 44 indicates the rate of penetration of the colored fluid in the paper.

To automatically control actuation of the fluid applicator reciprocating means and the indicating means, the cycling means includes an electrical operating circuit, generally indicated as 46, and a pneumatic circuit, generally indicated as 47. Operating circuit 46 is electrically connected to a suitable source of power 48 by a power switch 50 and includes a push button start switch 52, a holding relay 54 comprising a coil 56, and a spring-loaded switch 58, and an optical meter relay 60 comprising a coil 62 connected to ammeter 42 and a spring-loaded switch 64.

Operating circuit 46 is electrically connected to a solenoid 66 for operating a valve 68 in pneumatic circuit 47 to supply air pressure to pneumatic cylinder 26. Regulator valve 70 in pneumatic circuit 47 controls the rate of advance of fluid applicator 16 and its reentry into reservoir 14.

Operating circuit 46 is also connected to timer 44 through a spring-loaded microswitch 72 that is closed by contact with paddle 18 of fluid applicator 16. A completed test light 74 in operating circuit 46 operates as an alarm to indicate to the operator of the penetrometer that a test has been completed.

In operation of the penetrometer of this invention, power switch 50 is turned on, a sample of sized paper is placed in holder 10, and light source 32 is energized to focus a light beam onto the surface of the paper with collimator 34. The gain of amplifier 40 is then adjusted to provide a high arbitrary reading (hereafter referred to as the "100% level") on the dial of ammeter 42. The low limit set point of the ammeter is adjusted to any level below the "100% level," and preferably at 80% of the 100% level. Timer 44 is then set at zero.

With reference to the drawing, upon depression of start switch 52, solenoid 66 is energized, opening valve 68; and coil 56 of holding relay 54 is energized, closing switch 58. Since coil 56 is electrically connected to the power source through switch 58, holding relay 54 holds the circuit in operating condition, even though pressure is released on start switch 52.

The air supplied to cylinder 26 through valve 68 drives fluid applicator 16 upwardly and also drives paddle 18 adjustable stops 17 on the bottom of supporting plate 11. Stops 17 are pre-set so that the meniscus of the colored fluid in well 20 makes light uniform contact with the underside of the sample. At that instant, paddle 18 closes microswitch 72 and starts timer 44.

The supply of air is continuously fed to pneumatic cylinder 26 to maintain the fluid applicator in this position and to keep timer 44 running.

As the colored fluid, which has now been applied to the underside of the sample, penetrates through the sample, the reflected light received by photocell 38 decreases thus decreasing the electrical output transmitted to microammeter 42 by the cell. When the drop in electrical output of the cell reaches the pre-set low limit value on ammeter 42, an output is fed to relay 60.

As shown in the drawing, the output from the ammeter energizes coil 62 of relay 60, pulling up switch 64 and opening circuit 46 to stop timer 44 and deactivate solenoid 66 of valve 68, thereby shutting off the supply of air to pneumatic cylinder 26. Spring 20 then returns the fluid applicator to its initial position, with the air in cylinder 26 being discharged through regulator valve 70 and vent 76.

As further shown in the drawing, upward movement of switch 64 activates light 74 to indicate to the operator that the test has been completed. Since the power to operating circuit 46 has been disconnected by movement of switch 64, holding relay 54 is deactivated and spring-loaded switch 58 is returned to its open position. Microswitch 72 has also returned to its original position since the fluid applicator has been lowered and paddle 18 is no longer in contact with the switch.

Upon removal of the sample from holder 10 and insertion of a new or control sample, ammeter 42 moves off its set point and deactivates coil 62 of relay 60, returning switch 64 to its initial position and turning off test light 74. Hence, the pneumatic and operating circuits are now in their original positions and the device is ready for the testing of other samples of sized paper.

It can thus be seen that the penetrometer of this invention is fully automated, requiring only an initial action on the part of the operator to start the device. Once the device is started, it operates automatically to start and stop timer 44 at precise intervals and provides an accurate, quick, and convenient means for measuring the resistance of sized paper to penetration by fluids and thereby a measure of the efficiency of paper sizing compositions. Further, the device automatically resets itself for the next test without requiring any action by the operator other than removing and inserting a new sample and resetting the amplifier, if necessary to provide a meter reading of 100% of the starting point. The device thus saves the operator time and effort and eliminates sources of human error previously encountered in running sizing tests.

While the invention has been described as it relates to measuring the resistance of sized paper, it can also be used for testing the resistance of other similar sized fibrous materials.

This invention in its broader aspects is not limited to the specific details shown and described, and departures may be made from such details without departing from the principles of the invention and without sacrificing its chief advantages.

What is claimed is:
1. A device for measuring the resistance of fibrous material to penetration by a colored fluid comprising in combination:
   (a) means for holding a sample of the fibrous material;
   (b) a source of light for illuminating one surface of the sample;
   (c) light sensitive means for receiving light reflected by the sample and for producing an electrical output proportional to the amount of light received;

(d) a fluid applicator for applying a specific quantity of colored fluid to the surface of the sample opposite the illuminated surface;
(e) fluid applicator reciprocating means for bringing the colored fluid into and out of contact with the sample;
(f) indicating means for measuring the elapsed time interval between application of the colored fluid to the sample and a change in the electrical output of the light sensitive means to a predetermined value; and
(g) automatic cycling means for actuating and controlling the fluid applicator reciprocating means and the indicating means to bring the fluid into contact with the sample and simultaneously start the indicating means, said cycling means stopping the indicating means and withdrawing the fluid from contact with the sample when the electrical output of the light sensitive means reaches the predetermined value.

2. The device of claim 1, wherein the cycling means includes an alarm that is activated simultaneously with stopping of the indicating means.

3. The device of claim 1, wherein the fluid applicator includes a well for holding a specific quantity of the fluid and a reservoir for holding a supply of the fluid, the applicator reciprocating means first lowering the well into the reservoir to fill the well with fluid and then raising the well out of the reservoir to bring the meniscus of the fluid in the well into contact with the sample.

4. The device of claim 3, in which the applicator reciprocating means includes a single-acting pneumatic cylinder to raise the applicator and spring means to return the applicator to its initial position.

5. The device of claim 4, wherein the automatic cycling means includes an electrical circuit and a pneumatic circuit, said pneumatic circuit including a solenoid valve connected to the electrical circuit to control the flow of pneumatic fluid to the cylinder; and said electrical circuit including connecting means to connect the electrical circuit to a source of power to energize the solenoid and start the flow of fluid to the cylinder, switch means closed by the fluid applicator to start the indicating means at the instant fluid is applied to the sample, and an optical relay controlled by the light sensitive means to open the electrical circuit and stop the indicating means and the flow of fluid to the cylinder when the light sensitive means reaches the predetermined value.

6. The device of claim 5, in which the connecting means includes a spring-loaded start switch to initially connect the electrical circuit to the power source and the electrical circuit includes a holding relay to maintain the connection, said holding relay being deactivated when the electrical circuit is opened by the optical relay.

7. The device of claim 5, in which the light sensitive means includes a photocell that generates an electrical output proportional to the amount of light received by the cell, and an ammeter responsive to changes in said output, said ammeter activating the optical relay when it reaches the predetermined value.

8. The device of claim 5, in which the electrical circuit includes a light activated by the optical relay simultaneously with stopping of the indicating means.

9. The device of claim 5, in which the indicating means is a timer.

10. The device of claim 1, which includes a standardizing filter between the source of light and the sample, and a collimator to focus the beam of light from the light source on the sample.

References Cited

UNITED STATES PATENTS

| | | | |
|---|---|---|---|
| 2,868,062 | 1/1959 | Haley | 73—73 |
| 3,049,964 | 8/1962 | Miller et al. | 356—209 X |
| 3,360,722 | 12/1967 | Von Bethmann et al. | 324—65 |

WALTER STOLWEIN, Primary Examiner

U.S. Cl. X.R.

73—73; 250—219; 340—227

UNITED STATES PATENT OFFICE
CERTIFICATE OF CORRECTION

Patent No. 3,512,003           Dated May 12, 1970

Inventor(s) LeRoy H. Barnum, John W. Berry, And Raymond A. Herrmann

It is certified that error appears in the above-identified patent and that said Letters Patent are hereby corrected as shown below:

Column 4, line 3, before the word "adjustable" insert -- against --; Column 4, line 22 "Spring 20" should be -- Spring 30 --; Column 4, line 53, after "if necessary" insert a comma -- , --.

SIGNED AND
SEALED
OCT 20 1970

(SEAL)
Attest:

Edward M. Fletcher, Jr.
Attesting Officer

WILLIAM E. SCHUYLER, JR.
Commissioner of Patents